April 30, 1968 R. W. HODGSON 3,381,294
APPARATUS AND METHOD FOR PHYSICALLY DEFINING AN
INSTRUMENT-PERCEPTIBLE SPACIAL LOCATION
Filed Sept. 2, 1965 5 Sheets-Sheet 4
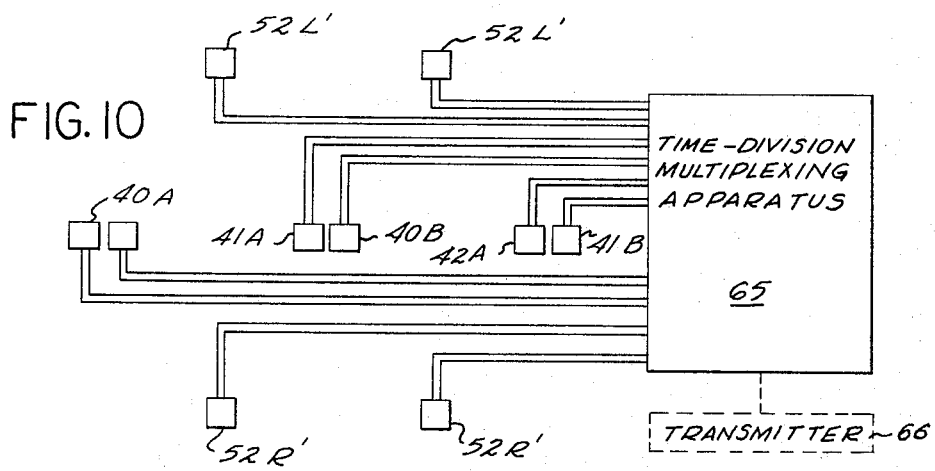
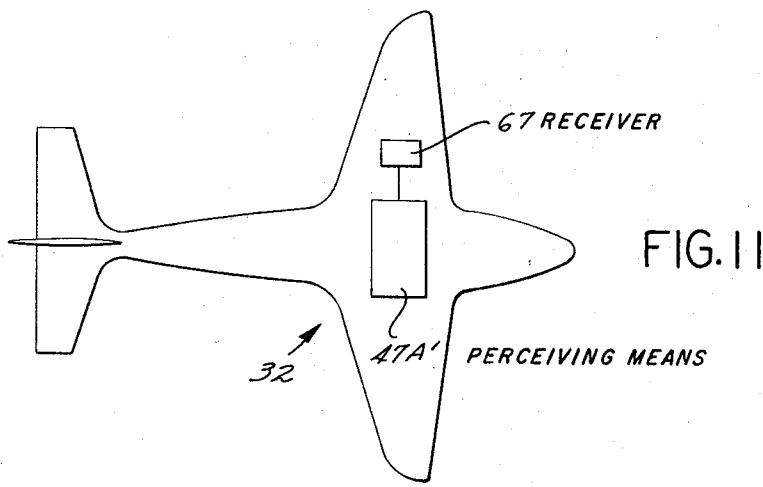
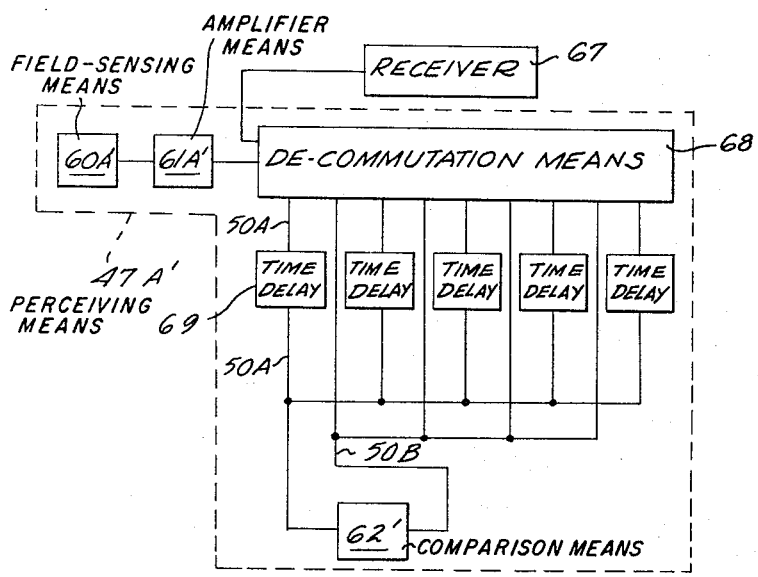
INVENTOR.
R. W. HODGSON April 30, 1968 R. W. HODGSON 3,381,294
APPARATUS AND METHOD FOR PHYSICALLY DEFINING AN
INSTRUMENT-PERCEPTIBLE SPACIAL LOCATION
Filed Sept. 2, 1965 5 Sheets-Sheet 5

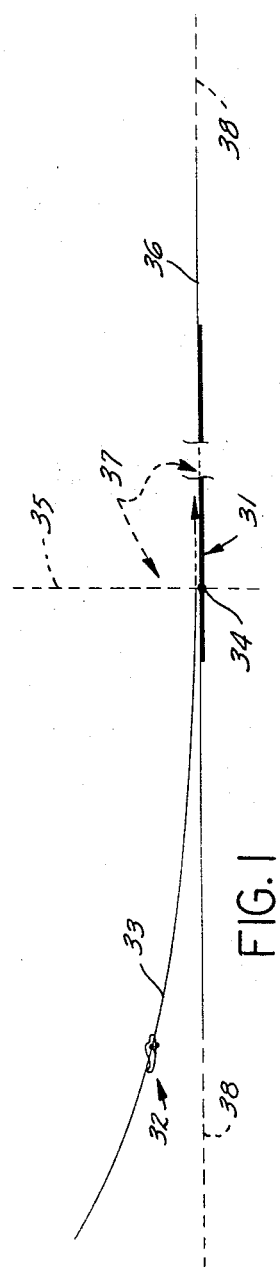
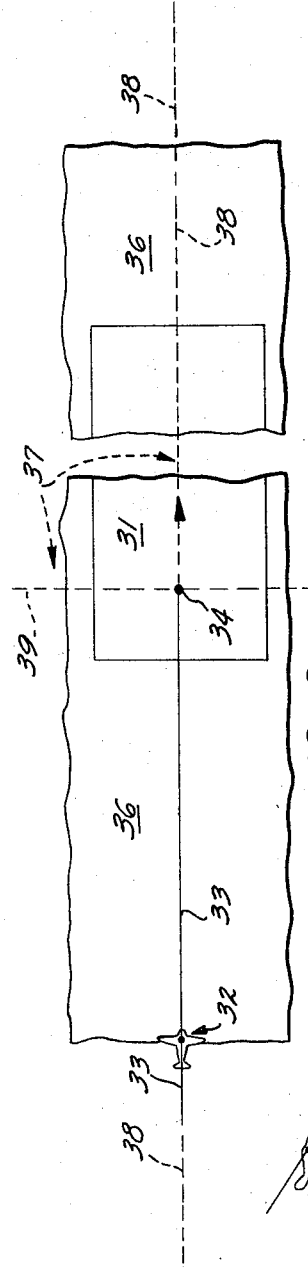
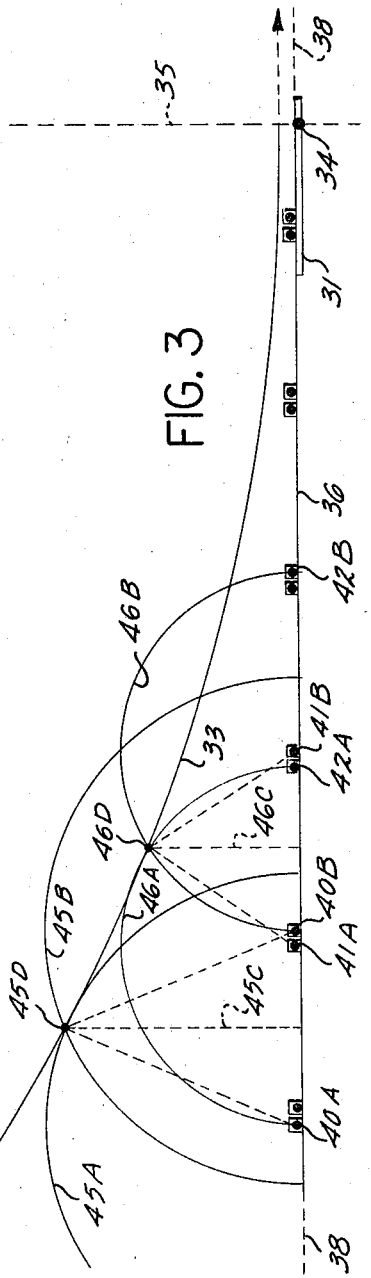
INVENTOR.
R. W. HODGSON

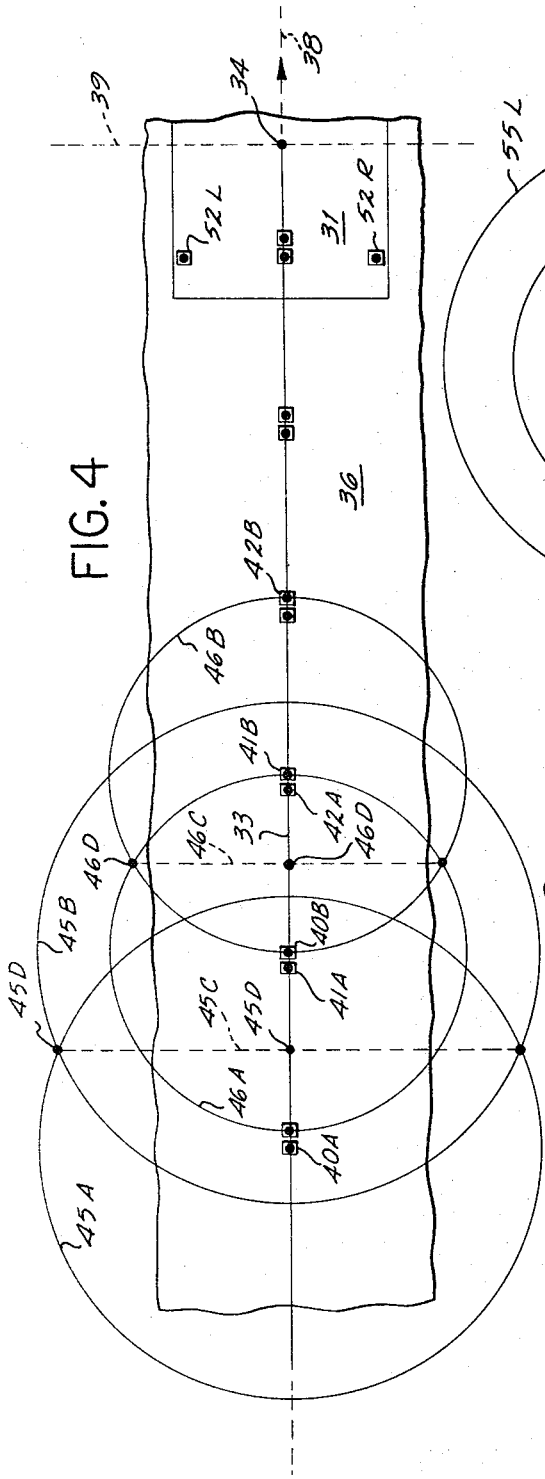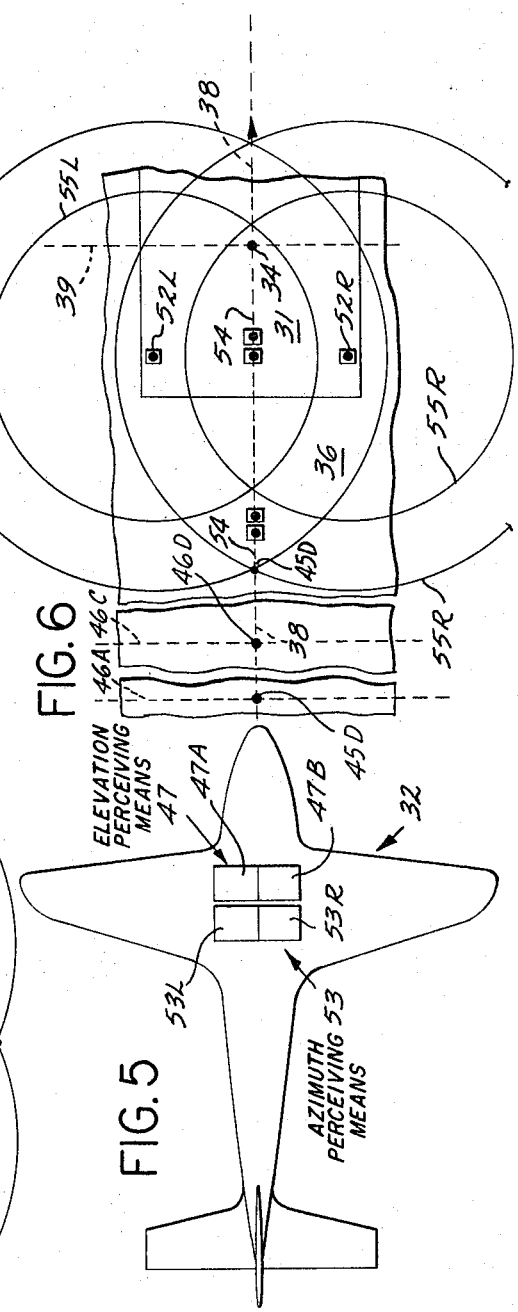

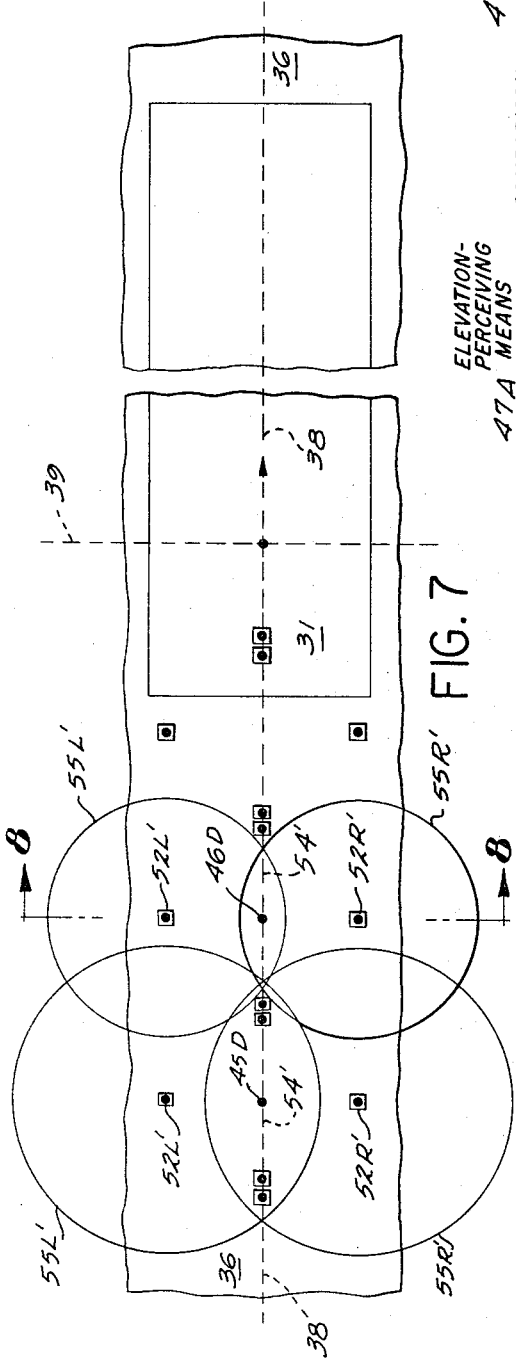

INVENTOR.
R. W. HODGSON

United States Patent Office 3,381,294
Patented Apr. 30, 1968

3,381,294
APPARATUS AND METHOD FOR PHYSICALLY DEFINING AN INSTRUMENT-PERCEPTIBLE SPACIAL LOCATION
R. W. Hodgson, Suite 6, 3406 W. Washington Blvd., Los Angeles, Calif. 90018
Continuation-in-part of application Ser. No. 183,856, Mar. 30, 1962. This application Sept. 2, 1965, Ser. No. 495,001
8 Claims. (Cl. 343—108)

This application is a continuation-in-part of my earlier patent application, Ser. No. 183,856, filed Mar. 30, 1962, now abandoned in favor of this present application.

Generally speaking, the present invention relates to apparatus and method for physically defining an instrument-perceptible physical spacial location. Broadly speaking, the physical spacial location may be a point, line, curve, or surface (or a small portion of said line, curve, or surface) in a predetermined relationship (remote or close) with respect to a center point (or any other desired point) of a co-ordinate frame of reference. In one specific exemplary form said physical spacial location may be a path of any desired configuration, but of substantial or appreciable length, in a predetermined relationship with respect to said center point (or other point) of said co-ordinate frame of reference.

In one specific practical application of the present invention to an important problem which exists in the aeronautical field (and, in a broad sense, in the astronautical field also) it takes a specific exemplary, but non-limiting, form wherein the invention comprises apparatus and method for physically defining an instrument-perceptible physical spacial path extending from a point remote with respect to said center point of said coordinate frame of reference toward same in a manner which may be said to comprise a physical spacial locus corresponding to an equation of the type Y equals a predetermined or preselected function of X relative to said reference center point of said co-ordinate frame of reference.

In a specific application of this illustrative form of the invention, said locus or path comprises the preferred descent or landing flight path of an aircraft which will bring about a perfect landing on an airstrip or the like.

Therefore, since this specific exemplary form of the invention applied to the defining of a perfect landing flight path for an aircraft is an extremely practical and highly advantageous exemplary embodiment of the present invention, it will be used as the form specifically referred to and described hereinafter.

However, it should be clearly and distinctly understood that this in no way limits the invention to said specific exemplary embodiment, since the inventive concept is very much broader than said specific exemplary embodiment and includes the provision of means and method for defining virtually any type of instrument-perceptible physical spacial location whether a path, locus, or otherwise in a desired relationship with respect to a frame of reference—or for defining a plurality of such points which can be said to together define a locus or path.

In order to understand the importance of the apparatus and method of the present invention as applied to the provision of an optimum landing flight path for an aircraft, for exemplary purposes, it should be noted that such an optimum landing flight path for an aircraft (considered from the standpoint of a side elevational view) is not in a straight line relative to the airstrip and at a predetermined angle of descent with respect thereto. If such were the case, existing equipment for facilitating the landing of an aircraft on an airstrip under poor visibility conditions would be adequate.

However, the ideal aircraft landing path comprises a curve in which the angle of descent changes as the airstrip is approached, and prior art equipment for facilitating the landing of an aircraft under poor visibility conditions does not provide any means for accurately defining such a curved landing flight path of varying angle of descent, relative to a true horizontal plane, which can be easily perceived by an instrument carried by the aircraft so that the pilot will at all times know that he is following an optimum landing flight path.

In other words, it has *not* been possible in the past to physically define, in an instrument-perceptible manner, physical spacial point locations which lie along a curved line such as is required for an optimum landing flight path.

However, the apparatus and method of the present invention does this very easily and adjustably so that any desired curved landing flight path can be physically defined in an instrument-perceptible manner so that an aircraft approaching an airstrip will perceive, by instrument means carried by the aircraft, when it is precisely on the desired optimum curved landing flight path and when it passes through each of the plurality of instrument-perceptible points lying along said path and which have been produced as a result of the operation of the apparatus and method of the present invention.

It will readily be understood that it is difficult to define, at any desired plurality of positions along a curved path in space, instrument-perceptible locations or points which are so sharp and distinct as to be easily perceived by instrument means carried by an aircraft. Certain forms of the present invention accomplish this by producing, for each such location or point, at least two different fields (usually originating from the ground adjacent to an airstrip, although not specifically so limited) which have an intercept location where said fields are in a measurable predetermined relationship to each other at one of the desired physical spacial locations or points which is to be defined in an instrument-perceptible manner. A plurality of pairs of such field-producing means, with each pair having a different intercept location lying at a position corresponding to a different one of said locations or points along a predetermined landing flight path curve are employed in these specific embodiments of the invention. It will be understood that each such pair of field-producing means producing a similar intercept location will effectively define a corresponding location or point along the curve of a desired landing flight path so that any desired configuration of flight path may be defined by merely adjusting the intercept locations of different pairs of the plurality of field-producing means.

In certain forms of the invention, the field-producing means may have distinctive characteristics varying as a function of azimuth angle with respect to the center point of the frame of reference (usually at an aircraft landing strip, or the like, although not specifically so limited) so that an aircraft approaching the landing strip for preception of the optimum curved landing flight path defined by the apparatus and method of the present invention will perceive and will maintain the proper azimuth heading.

However, in other forms of the invention, auxiliary azimuth-determining means, such as laterally or angularly displaced azimuth-determining field-producing means adapted to provide azimuth-determining field intercept locations where the intercepting fields bear measurable predetermined relationships to each other, may be provided for perception by an approaching aircraft whereby to provide the proper azimuth heading information to said aircraft for use during descent down the optimum curved landing flight path until touchdown on the airstrip.

In one specific illustrative form of the invention as applied to aircraft landing use, each pair of field-producing means may be positioned along a ground line underlying at least a portion of the desired curved downwardly descending landing flight path for the aircraft, although the invention is not specifically so limited.

In certain aspects of this specific form of the invention, each field-producing means of each different pair may be positioned at close to the same location, while in another specific version of this aspect of the invention, each field-producing means of any given pair of same may be very substantially spaced from the other and separated therefrom by a substantially rectilinear base line (usually substantially parallel to the line along which the pairs of field-producing means are spaced and lying underneath the intended downwardly curved landing flight path for an aircraft, although not specifically so limited).

It should be noted that when each field-producing means of any given pair of field-producing means is spaced from the other one, one of said field-producing means produces a first field which has an instrument-perceptible characteristic which varies as a first function of distance therefrom, while the other of said field-producing means produces a second field which has an instrument-perceptible characteristic which varies as a second function of distance therefrom, different from said first function of distance therefrom whereby to provide at only one equi-distant position, or a position spaced in a predetermined correlated manner therefrom, a sharply defined intercept location where said instrument-perceptible characteristics of said first and second fields bear a predetermined relationship with respect to each other.

For example, if said first field comprises an electromagnetic *induction* field, it will be understood that the instrument-perceptible characteristic thereof may comprise the magnetic field strength thereof which varies inversely in magnitude as a function of one power of special displacement. Also, if said second field comprises an electromagnetic *radiation* field, it will be understood that the instrument-perceptible characteristic thereof may comprise the magnetic field strength thereof which varies inversely in magnitude as a function of one power less of spacial displacement than said electromagnetic *induction* field. Therefore, it will readily be understood that only at a predetermined distance from each of the two field-producing means will said induction field and said radiation field bear a predetermined magnitude relationship (usually of equal magnitude, although not specifically so limited) to each other whereby to provide a measurable intercept location.

It will of course be understood that an approaching aircraft will be provided with means for perceiving said two fields and for effectively comparing them when equi-distant from said two field-producing means or when spaced therefrom in a predetermined correlated manner so that a predetermined relationship thereof will indicate that one of the desired physical spacial locations or points on the landing flight path has been reached. Each of the other locations or points along the landing flight path curve may be similarly defined, in an instrument-perceptible and comparable manner, by different pairs of perceived and compared magnitudes of different pairs of induction fields and radiation fields produced by corresponding ones of the different pairs of field-producing means lying in spaced relationship along a ground line underlying the curved downwardly descending landing flight path.

It will readily be understood that this will provide entirely adequate elevational information (at a given azimuth heading) for the landing aircraft to substantially follow the curved downwardly descending landing flight path perceived by its perceiving means so as to bring about an optimum landing of the aircraft on a landing strip irrespective of weather and visibility conditions.

Furthermore, it should be noted that the form of the invention just referred to lends itself very well to adjustment and portability. In other words, the magnitudes of the various fields produced by different pairs of the field-producing means can be readily adjusted by an airstrip operator to provide a desired landing flight path for virtually any known type of aircraft, and this can be done very rapidly.

Additionally, it should be noted that the field-producing means can be physically moved into any desired relationship with respect to the paired units thereof for flexibility in defining a desired flight path. This might be very useful in the event of a wind change.

Also, it should be noted that the paired field-producing means may comprise relatively small and readily portable units which can be transported from one location to another and there merely placed upon the ground in a desired relationship so as to quickly provide an effective landing guide for a new airstrip whether of a conventional type or merely a flat ground region suitable for the emergency landing of an aircraft.

Another specific form of the present invention, as applied to aircraft landing use, comprises an arrangement wherein only one of the compared fields for each intercept location is produced exterior of the approaching aircraft—although it consists of a number of different field portions of different instrument-perceptible characteristics (usually magnetic field strength, although not specifically so limited) produced by a corresponding plurality of field-producing means usually spaced along a ground line underlying at least a portion of the landing flight path descent curve.

In this specific version of the invention, the second field which is to be compared with the various first field portions at a corresponding plurality of locations or points along the desired curve downwardly descending landing flight path, comprises a comparison reference standard field produced by field-producing means carried by the aircraft and adapted to be effectively compared with the corresponding first field portion emanating from the corresponding one of the plurality of ground-line-positioned, spaced field-producing means.

It will be understood that, in this latter version, each ground-line-positioned, spaced field-producing means normally produces a field of a magnitude which is a function of its distance from the center reference point of the frame of reference (usually located on the airstrip) whereby the intercept locations provided by the various ground-line-positioned field-producing means will be progressively higher as they are more remote from the airstrip.

It should be clearly noted that in any or all of the various versions of the invention, means for minimizing any interference of the various fields may be provided, if desired. In certain forms of the invention, this may comprise time-division multiplexing or commutator means for commutating the plurality of field-producing means so that at any given instant only two elevation-determining fields will be perceived and compared, and the same applies with respect to azimuth-determining fields produced by azimuth-determining means of the type referred to generally hereinbefore.

With the above points in mind, it is an object of the present invention to provide novel instrument-perceptible spacial-location-defining means and method adapted to define a spacial location or a path in space of any desired configuration and/or length relative to a center point (or other point) of a co-ordinate frame of reference.

It is a further object to provide an apparatus and method of the character as set forth in the preceding object, wherein the apparatus and method is specifically adapted to define an optimum landing flight path curve in space which can be effectively perceived by an aircraft approaching a landing strip so that the aircraft can descend along the optimum flight path irrespective of weather and/or visibility conditions and can make a perfect landing every time.

It is a further object of the present invention to provide apparatus and method of the character referred to above, which is of a readily adjustable nature whereby the flight path configuration defined in an instrument-perceptible manner can be adjusted at will to conform to prevailing conditions and the requirements of any given aircraft.

It is a further object to provide apparatus and method of the character referred to above, wherein the apparatus lends itself to being constructed in a plurality of small readily portable units whereby to facilitate the rapid and easy installation with respect to a desired new airstrip landing area, the rapid and easy readjustment thereof relative to said airstrip when desired or required by conditions, and/or the ready removal therefrom when the airstrip is to be abandoned.

Further objects are implicit in the detailed description which follows hereinafter (which is to be considered as exemplary of the invention *only*, but not specifically limiting the invention thereto), and said objects will be apparent to persons skilled in the art after a careful study of said detailed description.

For the purpose of clarifying the nature of the present invention, several entirely illustrative and non-limiting embodiments of the apparatus form of the invention are illustrated in the hereinbelow-described figures of the accompanying drawings and are described in detail hereinafter—it being understood that, while apparatus is shown in the drawings, this in no way limits the invention to an apparatus form, since the method of the invention is implicit in the disclosure.

FIG. 1 is a greatly reduced-size diagrammatic, schematic, simplified, side elevational view showing an airstrip lying on a ground surface and showing an approaching aircraft which will land by descending along the optimum landing flight path shown whereby to provide a perfect landing on the airstrip. A frame of reference is also shown in this view. The various field-producing means are not shown in this view for reasons of drawing simplification.

FIG. 2 is a fragmentary, partially broken-away top plan view of the diagrammatic showing of FIG. 1.

FIG. 3 is a fragmentary, partial, enlarged-scale, side elevational view of the left portion of the airstrip and ground surface shown in FIG. 1. However, in this view a few of the plurality of longitudinally spaced pairs of field-producing means are shown as exemplary of the entire group thereof, and also two pairs of the intercepting elevation-determining fields produced thereby and the two intercept locations or portions thereof are clearly shown. These are considered exemplary of any desired number of said intercept locations or portions which effectively define the landing flight path. It should be noted that in this view only a few of the elevation-determining field-producing means are shown and none of the azimuth-determining field-producing means are shown for reasons of drawing simplification.

FIG. 4 is a fragmentary top plan view of the diagrammatic showing of FIG. 3. However, in this view a pair of the azimuth-determining field-producing means is also shown as exemplary thereof in addition to the exemplary pairs of elevation-determining field-producing means. It should be clearly noted that in this view the azimuth-determining fields produced by the azimuth-determining field-producing means are not shown in order to avoid confusion with the elevation-determining fields produced by the elevation-determining field-producing means.

FIG. 5 is an enlarged diagrammatic and simplified top plan view of an aircraft adapted to land along the landing flight path of FIGS. 1–4, and illustrates diagrammatically and schematically the perceiving means carried thereby for individually perceiving each pair of fields emanating from the ground-positioned field-producing means and for then comparing the magnitudes thereof for determining when a particular location or point in space, lying on a field intercept location of equal magnitude, has been reached.

FIG. 6 is a view generally similar to FIG. 2, but illustrates in detail the operation of the azimuth-determining field-producing means and how they provide a longitudinal intercept location coincident with the desired azimuth plane lying along a longitudinal ground line extension of the longitudinal center line of the airstrip. It should be clearly noted that, in this view, the elevation-determining fields produced by the elevation-determining, field-producing means are not shown in order to avoid confusion with the azimuth-determining fields produced by the azimuth-determining, field-producing means. It is of course understood that the elevation-determining intercepts produced by the elevation-determining fields, as shown in FIGS. 3 and 4, and the azimuth-determining intercept produced by the azimuth-determining fields clearly shown in FIG. 6 effectively intercept each other to provide uniquely determined points lying along the landing flight path.

FIG. 7 is a view generally similar to FIG. 6 but illustrates a slight modification of the azimuth-determining arrangement wherein several pairs of said azimuth-determining means are spaced along and on each side of a center ground line extension of the airstrip and provide a plurality of azimuth-determining locations or portions along the landing flight path intersecting, in each case, the corresponding intercepts of the elevation-determining fields.

FIG. 8 is an enlarged, fragmentary, partly broken-away view taken in the direction of the arrows 8—8 of FIG. 7 and illustrates the one typical azimuth-determining intercept which is taken to be typical of all.

FIG. 9 is a fragmentary schematic view, in block diagrammatic form, illustrating a typical perceiving means adapted to be carried by the aircraft for individually and separately perceiving the two fields to be compared, in this case elevation-determining fields, although the same structure would be suitable for perceiving and comparing azimuth-determining fields.

FIG. 10 is a fragmentary schematic view in block diagrammatic form illustrating the provision of time division multiplexing apparatus or commutator means for sequentially commutating either various pairs of the field-producing means (elevation-determining field-producing means and/or azimuth-determining field-producing means) in time-division sequence, or for so commutating each field-producing means of any of said pairs in time division sequence for synchronized reception and decommutation by a modified perceiving means of the type illustrated fragmentarily in FIG. 12. When such synchronizing is to be employed, the broken line synchronizing transmitter illustrated in FIG. 10 is employed. When such synchronizing is not required, said broken line transmitter is deleted.

FIG. 11 is a view generally similar to FIG. 5 but illustrates a slightly modified arrangement of the perceiving means carried by the aircraft and including a synchronization signal receiving and decommutation means and time delay means of the type illustrated in FIG. 12.

FIG. 12 is a fragmentary schematic view, in block diagrammatic form, partially illustrating a modified perceiving means adapted to be carried by the aircraft for the perception, separation, and comparison of commutated pairs of fields, with the fields of each pair being also commutated whereby to have one delayed slightly behind the other.

Figure 13:
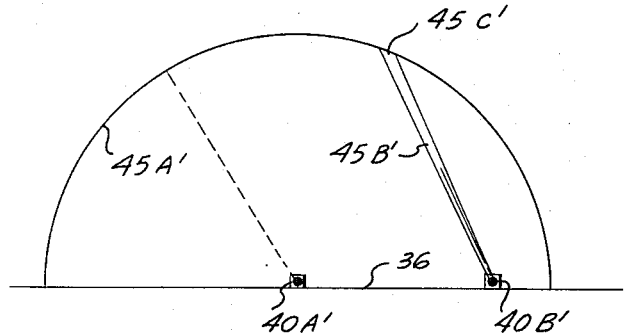

FIG. 13 is a fragmentary schematic and diagrammatic view generally similar to a left portion of FIG. 3, but illustrating a slight modification wherein one of the elevation-determining fields is illustrated as comprising a radiation field of relatively narrow width which can be caused to intercept the induction field at a desired intercept location.

Figure 14:
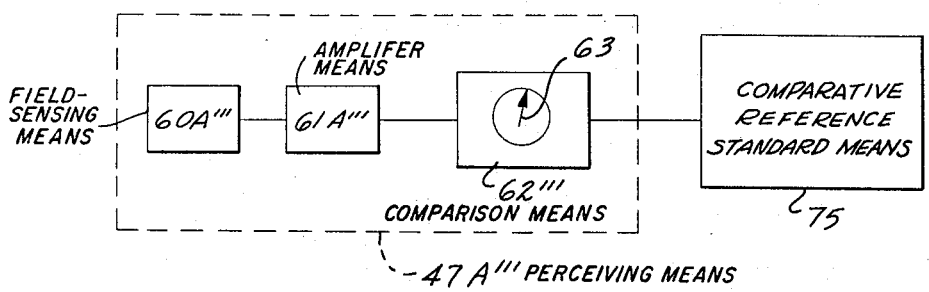

FIG. 14 is a view generally similar to FIG. 9, but illustrates a slight modification of the invention wherein the field originating from the ground, which is sensed by the perceiving means, is compared with a self-produced reference standard carried by the aircraft. This may be a reference standard field or a voltage, current, or other electrical quantity which can be compared with, or effectively balanced against, the electrical analog of the perceived ground-originated field.

Referring to the drawings for exemplary purposes, one illustrative embodiment of the invention is illustrated in a typical exemplary form wherein it comprises apparatus for physically defining an instrument-perceptible landing flight path for an aircraft approaching an airstrip.

In this exemplary form of the invention, the airstrip is designated generally by the reference numeral 31 and is shown diagrammatically and schematically.

Also, in this exemplary form of the invention, a typical aircraft is indicated generally by the reference numeral 32 and is shown diagrammatically and schematically in an approach position relative to the airstrip 31 at one particular location on an optimum landing flight path indicated diagrammatically at 33.

It should be noted that the curved optimum flight path 33 can be said to effectively comprise a physical spacial locus corresponding to an equation of the type Y equals a predetermined or preselected function of X relative to a reference center point, such as that shown diagrammatically at 34, of a coordinate frame of reference comprising the vertical axis shown in broken lines at 35 and the substantially horizontal ground line defined by the surface of the airstrip 31 and ground surface extensions 36 thereof.

Incidentally, it should also be noted that the ground line surface of the airstrip 31 and the ground surface extensions 36 thereof may be said to include two substantially perpendicular axes of the coordinate frame of reference, which is designated generally by the reference numeral 37, lying parallel to and along the length of the airstrip 31 (as indicated by the reference numeral 38) and lying across said airstrip 31 (as indicated by the reference numeral 39).

However, said axis 39 of said coordinate frame of reference 37 which extends across the airstrip 31 need not be considered in determining the position of the flight path 33 if said flight path 33 lies directly parallel to the longitudinal direction of the airstrip 31 and directly overlies the left end (as viewed in FIGS. 1 and 2) of the ground line extension 38 thereof—in other words, if said landing flight path 33 has a predetermined azimuth heading relative to the center point 34 of the coordinate frame of reference 37.

As will be pointed out later on, the present invention includes means and method adapted to provide the aircraft 32 with the proper information for causing said aircraft 32 to maintain the desired predetermined or preselected azimuth heading relative to said reference center point 34 of the coordinate frame of reference 37.

The present invention may take numerous different embodiments within the broad scope of the invention. However, for the purpose of illustrating the inventive concept of the present invention, a few specific forms of the many possible forms will be illustrated in detail, although somewhat diagrammatically. It should be clearly understood that this is for exemplary purposes only, and is not intended to limit the scope of the invention to said specific versions only.

One such exemplary arrangement for physically defining an instrument-perceptible landing flight path of the type shown at 33 in FIG. 1 comprises an arrangement wherein pairs of field-producing means are positioned in spaced relationship parallel to the airstrip 31 and the desired landing flight path 33 as is diagrammatically shown in FIGS. 3 and 4.

In this specific arrangement, each pair of field-producing means comprises a first field-producing means and a second field-producing means which are shown as being longitudinally spaced apart along the direction of and underlying the desired landing flight path 33. The longitudinal spacing therebetween can be adjusted in accordance with the more detailed teachings set forth hereinafter.

The first exemplary pair of said field-producing means shown in FIGS. 3 and 4 is designated by reference numerals 40A and 40B for the two individual field-producing means thereof. The two field-producing means of the second pair shown in FIGS. 3 and 4 are correspondingly designated by the reference numerals 41A and 41B. The two field-producing means of the third pair thereof are correspondingly designated by the reference numerals 42A and 42B, and so on, for each succeeding pair of field-producing means.

It should be clearly noted that this particular longitudinal spacing and positioning of the two field-producing means of each pair (in each case designated by a reference numeral) followed by the letter A for one of the pair and the letter B for the other one of the pair illustrates (partially) one exemplary form of the invention only, and is not to be construed in a limiting sense since numerous other positionings and/or spacings are within the scope of the broad inventive concept of the present invention.

However, in the specific form illustrated, it will be noted that the field-producing means, such as 40A and 40B, etc., of any given pair thereof produces in surrounding space first and second electromagnetic fields, such as those shown at 45A and 45B in FIGS. 3 and 4, which are, in the example illustrated, of substantially semispherical configuration, each providing around its source 40A and 40B, respectively at any radial distance a semi-spherical field of equal magnitude over the entire semi-spherical surface thereof.

Each of said electromagnetic fields 45A and 45B has an instrument-perceptible characteristic (magnitude in the example illustrated in FIGS. 3 and 4) which corresponds to an equation of the type Y equals a desired function of X (displacement) relative to the source 40A and 40B and, therefore, also relative to the reference center point 34 of the coordinate frame of reference 37.

In the specific example illustrated in FIGS. 3 and 4, said first electromagnetic field 45A may comprise an electromagnetic induction field which varies inversely in magnitude as one power of spacial displacement (for example, the cube of spacial displacement).

Also, in the specific example illustrated in FIGS. 3 and 4, the second electromagnetic field 45B may comprise a radiated electromagnetic field which varies inversely in magnitude as one power less of spacial displacement than the inverse magnitude variation of said electromagnetic induction field 45A with spacial displacement (for example, the square of spacial displacement).

This will produce an equi-distant or correlatedly spaced intercept location of the two fields 45A and 45B along the semi-circular intercept line 45C where the two magnitudes are in a predetermined relationship to each other. (In one preferred form of the invention, this predetermined relationship comprises an equal and opposite balanced relationship such that the two magnitudes are equal along the intercept location semi-circular line 45C.)

At all other spacial regions equi-distant from the sources 40A and 40B or correlatedly spaced in a predetermined manner therefrom, it will be found that the two magnitudes differ from said predetermined relationship and, therefore, it can be said that the two field-producing means 40A and 40B and the fields 45A and 45B produced thereby effectively define the intercept location 45C in a unique manner which distinguishes it from all other regions in space—and in an instrument-perceptible manner, since the two fields 45A and 45B are perceptibly different so as to be capable of individual perception by instrument means carried by the aircraft 32; such instrument means being indicated diagrammatically at 47 in FIG. 5 and comprising two individual portions 47A and 47B for the individual perception of the corresponding one of the two fields 45A and 45B, and for comparing same when equi-distant or correlatedly spaced in a predetermined manner from the two sources 40A and 40B.

It will be noted that, for exemplary purposes, the field-producing means 40A is shown diagrammatically in FIGS. 3 and 4 as comprising any conventional type of elecro-magnetic field-producing means for producing a desired relatively low-frequency (in certain cases, of zero frequency) electromagnetic field of a desired magnitude and of a wave length may times longer than the spacial distance to the intercept location 45C so that the field 45A present at the spacial intercept location 45C will comprise substantially entirely or predominantly an induction field rather than a radiation field.

It will also be noted that, for exemplary purposes, the field-producing means 40B is shown diagrammatically in FIGS. 3 and 4 as comprising any conventional type of electromagnetic radiation field-producing means for producing and radiating into space a substantially higher frequency electromagnetic field of a wavelength shorter than the special distance to the intercept location 45C so that the field 45B present at the spacial intercept location 45C will comprise substantially entirely or predominantly a radiation field rather than an induction field. The above-described arrangement is highly advantageous since an induction field varies inversely by one power greater of spacial displacement than does the magnitude of a radiation field. Therefore, the intercept location 45C will be sharply defined, and any spacial locations near thereto will find a very pronounced difference in the magnitudes of the twe fields such that the two different portions 47A and 47B of the perceiving means, indicated generally at 47 and adapted to be carried by the aircraft 32, will be able to perceive or receive and compare the very distinct differences in the magnitudes of the two fields 45A and 45B at any locations correlatedly spaced in a predetermined manner from or equi-distant from the sources 40A and 40B and other than precisely on the intercept location 45C.

Various means may be employed for causing the two different perceiving portions 47A and 47B of the perceiving means 47 to perceive only the corresponding fields 45A and 45B in an individual and discriminatory manner. One such arrangement arises from the fact that the two different fields 45A and 45B may oscillate at different frequencies. Therefore, the two different perceiving means portions 47A and 47B may merely be correspondingly tuned for the exclusive reception of the proper field. It should be clearly noted that this is exemplary only and that numerous other discriminating arrangements, means, and/or methods may be employed for perceiving the proper field. Furthermore, it should be noted that in certain instances the induction field 45A may be quasi-static or actually static, if desired.

It should be noted that each of said two different perceiving means portions 47A and 47B may effectively comprise, or be provided with, distance measuring means for effectively measuring the distance to the corresponding source 40A and 40B, respetcively, and correlated with each other to allow the effective comparison of the two different fields 45A and 45B only when the distances to the two sources 40A and 40B from the corresponding perceiving portions 47A and 47B are equal. Said distance measuring means may merely be means for effectively oomparing carrier waves carrying each of said two different fields 45A and 45B or may comprise conventional equipment of a type well-known in the aircraft instrument art and conventionally called DME, or distance measuring equipment, or any other functional equivalent thereof may be employed for this purpose. The whole purpose of this is to cause the comparison of the induction and radiation fields 45A and 45B, respectively, to occur only at positions equi-distant from sources 40A and 40B thereof in this exemplary form of the invention where said sources 40A and 40B are spaced apart along a base line.

With the arrangement just described extended to provide multiple intercept locations similar to that shown at 45C and at 46C (the intercept of fields 46A and 46B) spaced along the landing flight path 33, it can be said that the points (such as 45D, 46D, etc.) lying along the desired flight landing path 33 have been defined in an instrument-perceptible manner, if the azimuth heading of the flight path 33 is fully determined relative to the center point 34 of the coordinate frame of reference 37 (and, therefore, relative to the airstrip 31).

Therefore, the apparatus becomes fully effective as a means for determining a landing flight path of any desired configuration, if such azimuth heading indicating and/or determining means is provided in addition to the apparatus described hereinbefore.

One form that this may take (as shown in FIG. 6) is a pair of laterally positioned azimuth-determining field-producing means 52L and 52R which are positioned in laterally offset relationship with respect to the longitudinal ground line 38 of the airstrip 31 and which produce in space instrument-perceptible fields adapted to be perceived and effectively compared by additional instrument-perceiving means 53 having the two perceiving portions 53L and 53R.

The fields produced in space by the two laterally positioned azimuth-determining field-producing means 52L and 52R may be of any desired type which have a plurality of effective intercept locations 54 of balanced magnitude along the desired azimuth heading and which, therefore, can be perceived by the two perceiving portions 53L and 53R of the azimuth-field-perceiving means 53 and effectively compared for the purpose of maintaining the aircraft 32 along the desired azimuth heading relative to the center point 34 of the coordinate frame of reference whereby to cause the flight path to lie exactly along predetermined intersecting points 45D, 46D, etc. of the corresponding plurality of intercept locations 45C, 46C, etc. uniquely defined by each pair of elevation-determining fields, such as shown at 45A and 45B, produced by the elevation-determining pairs of field-producing means, such as the pairs shown at 40A and 40B, for example.

In one illustrative form, the azimuth-determining field-producing means 52L and 52R may be arranged in a manner such as is illustrated in FIG. 6 and the fields produced thereby, as indicated at 55L and 55R, may have semi-spherical surfaces of equal magnitude at any point along the azimuth plane in which the ground line 38 lies. In other words, each of the fields may be a radiation field of equal magnitude (usually of different frequencies for individual perception purposes) adapted to be perceived by the corresponding portions 53L and 53R of the perceiving means of FIG. 5. It will be understood that the two fields 55L and 55R effectively define a continuous intercept line 54 lying in said azimuth plane which also contains the ground line extension 38.

FIGS. 7 and 8 illustrate a slightly varied form of the azimuth-determining field-producing means, in this case designated by the reference numerals 52L' and 52R'. In this version, there are a plurality of such pairs of azimuth-determining field-producing means 52L' and 52R' longitudinally spaced along and on each side of the desired azimuth plane which directly overlies the ground line extension 38. Each such pair of azimuth-determining field-producing means 52L' and 52R' may produce interlocking and intercepting induction and radiation fields similar to those shown at 45A and 45B in FIGS. 3 and 4, although in this case defining a semi-circular intercept line 54' which lies directly in the desired azimuth plane and directly above the longitudinal ground line 38. Since each of the transversely directed intercepting azimuth-determining fields 55L' and 55R' is similar to those shown at 45B and 45A in FIGS. 3 and 4 and which have been described in detail hereinbefore, no additional description of how the intercept location 54' is produced will be set forth at this point because it is believed that such explanation would be redundant in the light of the earlier explanation. Each pair of the laterally positioned azimuth-determining field-producing means 52L' and 52R' operates in the same manner and effectively defines a similar semi-circular intercept location 54' which intercepts the corresponding intercept locations 45C, 46C, etc., defined by the elevation determined fields 45A, 45B, 46A, 46B, etc., as illustrated in FIGS. 3 and 4. This effectively and uniquely defines each of the plurality of points 45D, 46D, etc., which lie along the landing flight path 33 as is best shown in FIG. 3.

Either of the above-described arrangements will uniquely define in space, in an instrument perceptible manner, the flight path 33 such that the aircraft 32 which is to land upon the airstrip 31 can perceive the elevation determining fields, such as those illustrated at 45A and 45B, at each of the intercept locations 45C, 46C, etc. by the elevation-perceiving means 47 and can also, by way of the azimuth-perceiving means 53, perceive the interlocking azimuth-defining fields produced by the azimuth-field-producing means 52L and 52R (or 52L' and 52R' in FIGS. 7 and 8) whereby to maintain the desired azimuth heading while flying along at a precisely determined elevation (and, in certain cases, attitude by reason of attitude-determining means responsive to elevation) relative to the coordinate frame of reference 37 and in particular relative to the ground line 38. This will make it possible to always bring about a perfect landing of the aircraft 32 irrespective of weather conditions and visibility.

Furthermore, it should be noted that by adjusting the strength of the various elevation-determining fields, such as those shown at 45A and 45B, the height of the corresponding intercept location 45C may be correspondingly adjusted.

It should be further noted that by adjusting the longitudinal spacing of the elevation-determining field-producing means, such as those shown at 40A and 40B, the length direction of the flight path 33 may be adjusted.

It should be further noted that, by adjusting the angular orientation of the azimuth-determining field-producing means 52L and 52R (or 52L' and 52R') relative to the airstrip 31 and the center point 34 of the coordinate frame of reference 37, the azimuth heading may be adjusted as desired.

All of these adjustments make it possible to very quickly and easily adjust a landing flight path to correspond to prevailing conditions and/or the requirements of an approaching aircraft which is to land.

Incidentally, in connection with the above, it should be noted that the azimuth-determining field producing means 52L and 52R (or 52L' and 52R') are exemplary only and are not intended to specifically limit the invention to this precise arrangement since numerous other ways of adequately defining the azimuth heading of the landing flight path 33 may be employed within the broad scope of the present invention.

It should be clearly noted that the perceiving means 47 adapted to be carried by the aircraft 32 is normally additionally provided with comparison means for effectively comparing the magnitudes of the two fields perceived by the two portions 47A and 47B thereof—for example, the magnitudes of the two fields 45A and 45B. This will only occur when the previously-mentioned distance measuring means or DME provided in association with, or comprising a part of, said two perceiving portions 47A and 47B indicate equal distances to the two sources 40A and 40B, as previously described.

Portion 47A of said means may be of the type illustrated diagrammatically and schematically in FIG. 9 wherein the field-sensing means 60A senses and perceives the corresponding induction field 45A. This may be any type of means capable of sensing and perceiving an electro-magnetic induction field and is not specifically shown in detail since such physical arrangements are well-known in the art.

Said field-sensing means 60A is of the type adapted to produce a corresponding electrical output which is usually amplified, such as by amplifier means 61A, and is then fed into comparison means 62 comprising a balancing circuit and indicating means 63 such as a meter, or other measuring or indicating instrument, or the like.

The other portion 47B of the perceiving means includes a radiation field sensing means of any conventional type such as an antenna, or the like, although not specifically so limited, indicated diagrammatically at 60B, which may be of any well-known type and is therefore not shown in detail, and which is adapted to produce a corresponding electrical output which is usually amplified, such as by amplifier means 61B, and is then fed into said comparison means 62 in opposition to the input from the other induction field-sensing means 60A and amplifier means 61A.

The previously-mentioned distance measuring means or DME associated with, or comprising a part of, each of said two perceiving means 47A and 47B are indicated by the block diagram portion 60A' associated with the field-sensing means 60A and the block diagram portion 60B' associated with the other field-sensing means 60B and each of which feeds through the corresponding amplifier means 61A and 61B, respectively, into the comparison means 62 and effectively inactivates it except when each of said distance measuring means or DME means 60A' and 60B' indicate equal distances to the field sources 40A and 40B, at which time the comparison means 62 will be operative for effectively comparing the two fields 45A and 45B in the manner described hereinabove and hereinafter.

Throughout this application, frequent reference is made to the comparison of the two fields, such as the fields 45A and 45B as best shown in FIG. 3, as being effected by the apparatus of FIG. 9, or comparable structures of the various modified forms of the invention referred to hereinafter, *only* when the perceiving means carried by the aircraft is *equi-distant* from the sources 40A and 40B of the two fields 45A and 45B. It should be clearly understood that this is one specific exemplary arrangement *only*, when the two sources 40A and 40B are physically separated from each other and do not emanate from the same point of origin, and that since this is a convenient form of the broader general concept of the invention, it has been employed throughout this application at many places. However, it should be clearly understood that the reference to said distances from the said perceiving means, such as that shown at 47A and 47B in FIG. 9, to the two sources 40A and 40B need not, in all cases, be equi-distant, which is a special case only of the broad generic principle governing the situation, which is that said two distances should bear a predetermined relationship to each other, which need not necessarily be a one-to-one relationship. Thus, the distance measuring means, or DME, such as the elements shown at 60A' and 60B' of FIG. 9, would cooperate with the comparison means 62 in a manner such as to render it operative only when said predetermined relationship exists between the two different distances between the perceiving means 47A and the source 40A and the perceiving means 47B and the source 40B. It should be clearly understood that throughout this application, the word "equi-distant," or any similar words, when referring to this feature of the invention, are to be broadly construed in the light of the statement which has just been made, indicating that it is intended to include and comprehend the broad meaning specifying that said distances bear a predetermined relationship to each other when the comparison of the fields 45A and 45B is permitted by the apparatus of FIG. 9.

When the two inputs, comprising the induction field input and the radiation field input, are in a predetermined relationship (usually an equal and opposite balanced relationship, although not specifically so limited), the balancing and comparison means 62 will indicate (by way of the indicating means) that this condition prevails, or will appropriately control an automatic pilot, or the like, for governing the landing flight path of the aircraft 32. This will, of course, mean that the aircraft 32 has just reached one of the landing flight path points (such as 45D in FIG. 3, for example) defined by any one of the intercept locations, such as the one shown at 45C, etc., and by the azimuth intercept location 54 (or 54′) perceived by the azimuth-perceiving means 53 which is of a type generally similar to the elevation-perceiving means 47 (although additional distance measuring means such as 60A′ and 60B′, as shown in FIG. 9, need not be included except in forms thereof wherein pairs of azimuth-determining intercepting fields comprising radiation and induction fields are employed in the manner shown in FIGS. 7 and 8) and embodies balanced opposed sensing means and amplifiers and a central comparison or balancing unit generally similar to the diagrammatic showing of FIG. 9 just described and illustrated in detail in connection with the elevation-perceiving means 47. The only major difference in the azimuth-perceiving means 53 is the fact that sensing means (similar to 60A and 60B) for sensing the azimuth-determining fields from the azimuth-determining field-producing means 52L and 52R (or 52L′ and 52R′) are discriminatory or selective in different manners so as to sense the corresponding fields only and to exclude all others.

In certain forms of the invention, where any remote possibility of interference between the various position-determining fields is to be completely prevented, this may be accomplished by providing time-division multiplexing or commutating means for causing each pair of elevation field-producing means, such as the pair shown at 40A and 40B, and the remainder of pairs spaced along the ground line 38 to be sequentially energized or to be sequentially effectively rendered operative as far as producing the corresponding intercepting fields in space is concerned. However, it should be clearly understood that each field-producing means of any given pair thereof is simultaneously rendered operative with the other one.

The sequential rendering operative or energization of each pair of said elevation field-producing means may preferably sweep along the length of the longitudinal arrangement of said pairs along the ground line 38, preferably inwardly toward the airstrip 31 to the inner pair and then repeat again beginning with the outer pair and so on, although the invention is not specifically so limited.

It should also be noted that the azimuth determining field-producing means, such as the pair shown at 52L and 52R (or each pair 52L′ and 52R′) may also be arranged to be rendered operative as part of said time-division multiplexing or commutating arrangement so as to avoid any interference whatsoever with any of the other fields.

It should also be noted that the means for effectively distinguishing the various pairs of fields which are to be perceived or sensed and compared with each other may comprise means other than using distinctive and easily distinguished frequencies of oscillation of the individual fields. In certain cases, this may comprise an arrangement for synchronizing the perceiving means carried by the aircraft relative to the individual time-division multiplexed or commutated elevation-determining and/or azimuth-determining fields produced by the field-producing means such as shown at 40A and 40B, 52L and 52R (or 52L′ and 52R′) etc., whereby at any given instance, only one particular field is being perceived by the perceiving means and the magnitude or other measurable electrical characteristic thereof is effectively stored for comparison with the subsequently perceived magnitude of the field with which it is to be compared.

This involves an arrangement, such as is illustrated diagrammatically and schematically in FIG. 10 wherein time-division multiplexing apparatus is indicated at 65 for causing the sequential commutated energization or rendering operative of the various field-producing means and wherein a signal is broadcast from transmitter means 66 carrying a synchronizing signal adapted to be received by receiver means 67 (shown in FIGS. 11 and 12) carried by the aircraft 32 and fed into the corresponding de-commutation means 68 whereby to take the signal received from the perceiving means 47A′ and feed it through a first lead 50A into time delay means 69 of a particular channel for subsequent comparison in a comparison unit 62′ with a second signal subsequently received by the perceiving means 47A′ and fed directly through a second lead 50B of said channel into the comparison means 62′ in opposition to the signal carried by said first lead 50A of said channel which was time delayed in entering said comparison means 62′. The two signals of each channel are similarly compared—each pair in sequence. Of course, distance measuring means or DME equipment of the same general type as described in connection with FIG. 9, and as illustrated therein at 60A′ and 60B′, may be similarly associated with the modified form of the invention illustrated in FIGS. 11 and 12 for only making the comparison of the two signals referred to in the preceding sentence when the distances to the two different physically spaced sources, such as shown at 40A and 40B in FIG. 10, for example, are determined to be equi-distant (or in a predetermined relationship) by said distance measuring means or DME.

In other words, an effective comparison of each pair of two subsequent-in-time perceived fields is effectively accomplished by this means and in the manner correlated, by reason of the airborne de-commutation means 68, with the ground multiplexing apparatus or commutator means 65 so that the proper pairs of fields will be effectively perceived in sequence, with one of each pair being time delayed, and will then be effectively compared in sequential pairs to produce final results generally similar to that described hereinbefore in connection with the first above-described system.

It should also be noted that the azimuth-determining field-producing means 52L and 52R (or 52L′ and 52R′) may take another form wherein they may consist of a plurality of such field-producing means 52L′ (or 52R′) laterally offset from the ground line 38 along which the elevation-determining field-producing means such as 40A and 40B are spaced and on one side only of the elevation-determining field-producing means 40A and 40B, etc., instead of being on opposite sides thereof as shown in FIGS. 7 and 8. When such is the case, the azimuth-determining field 55L′ (or 55R′) originating from each laterally-positioned azimuth-determining field-producing means effectively intersects the intercept line 45C produced by the two longitudinally adjacent paired elevation-determining fields 45A and 45B whereby to uniquely determine a point 45D in space. In this instance it is merely necessary to have the azimuth-determining receiving means 53 carried by the aircraft 32 effectively compare the field strength of the azimuth-determining field 55L′ (or 55R′) with that of either or both of the two elevation-determining fields 45A or 45B by comparing apparatus of the general type shown in FIG. 9.

On the other hand, the version of the above-mentioned arrangement including pairs of azimuth-determining field-producing means 55L and 55R′ on each side of the elevation-determining field-producing means, such as shown at 40A and 40B, may effectively intercept each other to provide an intercept location or portion of semi-circular shape such as is shown at 54′ and which lies in an azimuth-determining plane at right angles to the elevation-determining intercept location 45C whereby to uniquely define one point 45D on the landing flight path 33. It will, of course, be understood that the two laterally adjacent azimuth-determining fields emanating from each pair of azimuth-determining field-producing means will be perceived and compared by the azimuth receiving means 53 in a manner similar to that described hereinbefore and also similar to that described in connection with the elevation field-perceiving means 47.

It should also be noted that, in certain forms of the invention, each of the radiation field-producing means of each pair of field-producing means, such as the one illustrated fragmentarily at 40B' in FIG. 13 may be of a type adapted to produce a relatively narrow beam 45B' of radiation which will, therefore, be appropriately directed to intercept the semi-spherical induction field 45A' at the desired intercept location 45C' as is illustrated in diagrammatic fragmentary form in FIG. 13.

It should also be noted that, in certain forms of the invention, the intercept location or portion of the two fields produced by the two field-producing means of each pair thereof, such as shown at 40A and 40B in FIGS. 3 and 4, for example, need not be located in a vertical plane lying symmetrically between said two field-producing means.

It should be noted that an electromagnetic induction field is predominant and has a greater magnitude than an electromagnetic radiation field when displacement from the means producing same is less than the wavelength of the field divided by two pi, that the induction and radiation fields are of equal magnitude when the displacement is at a distance equal to the wavelength divided by two pi, and that the radiation field is predominant and has a greater magnitude than the induction field at distances greater than the wavelength of the field divided by two pi. This is a general characteristic of electromagnetic fields, and the above-described exemplary versions of the present invention employ this principle for the purpose of providing a very definite and distinct intercept for each pair of fields by causing one of each of said fields to be primarily a radiation field (in accordance with the above principle) and by causing the other of said fields to be primarily an induction field (also in accordance with the above principle). However, the invention is not specifically so limited in all versions thereof.

It should be noted that, broadly speaking, the exemplary forms of the invention which have been described to this point consist of means for defining one or more points in space comprising means for producing a first field and means for producing a comparison reference standard which can be effectively compared with respect to some instrument-perceptible characteristic of said first field so that when a predetermined relationship exists therebetween, this indicates that the perceiving operation has occurred at a predetermined point in space.

In the earlier exemplary forms described hereinbefore, said comparative reference standard has comprised a second comparative reference standard field produced by second field-producing means and, in all of the forms described hereinbefore, has been positioned remote from the perceiving means carried by the aircraft.

However, this is not necessarily so in all cases and, in the exemplary form which will now be described, a different means for producing said comparative reference standard for effective comparison with the first field will be described.

In this exemplary modification, said comparative reference standard is actually produced by the aircraft 32 which perceives the first field emanating from the ground-positioned field-producing means and compares said perceived field with its own self-produced comparative reference standard for uniquely determining when any particular one of a plurality of points in space has been reached by the aircraft 32.

This version of the invention may assume a particular form as illustrated diagrammatically, schematically, and fragmentarily in FIG. 14 wherein the means for producing said comparative reference standard comprises means, such as an electromagnet 75 or the like, having a predetermined or preselected (and, in certain cases, controllably adjustable) NI product—in other words, ampere turns which produces a comparison reference standard electromagnetic field of a corresponding magnitude which can be perceived and balanced against the field originating from the ground from any of the individual ground-positioned field-producing means for uniquely determining the various different points in space lying along the flight path 33.

On the other hand, it should be noted that said comparative reference standard may merely comprise a constant voltage, current, or other electrical or physical value, or equivalent, which can be directly fed into the comparison and balancing unit 62''' for comparison with the electrical analog of the ground-originated field perceived by the sensing means 60A''' of the elevation-perceiving means 47'''.

In the FIG. 14 form of the invention, means similar to that shown in FIG. 9, with reference to the distance measuring means or DME, 60A' and 60B' may also be employed for determining that the perceiving means 47A'' is exactly equi-distant between two different predetermined positions along the landing strip (one of which is coincident with the source of the perceived field), or for determining that the distances from the perceiving means 47A''' to said two different predetermined positions are in a predetermined relationship to each other, so that the comparison of the perceived field with the comparative reference standard means carried by the aircraft will uniquely and precisely determine an intercept location of the type referred to hereinbefore in connection with the earlier forms of the invention, such as the first form of the invention, as best illustrated in FIG. 3. However, various other functionally equivalent arrangements for determining the vertical plane when the comparison is made may also be employed in this form of the invention.

It should be noted that the various perceiving means in the various forms of the invention described to this point for exemplary and non-limiting purposes may comprise any means for perceiving an induction field or a radiation field such as magnetometers, "Magnetrons," antennae, etc. Also, the field-producing means for producing the various fields may comprise various types of electromagnetic means involving either coils, antennae, or the like, energized by suitable electric current producing means (usually oscillation generator means, although not specifically so limited) having precisely controlled and, in preferred forms of the invention, controllably adjustably ampere turns' products or radiating power whereby to produce in space precisely the desired magnitude of said elevation-determining fields and/or said azimuth-determining fields.

The details of the physical structures of the field-producing means, the field-perceiving means, the amplifier means, and the comparison means are not shown specifically, but rather in block diagrammatic schematic form since the invention does not lie in these precise details, per se, but in the interrelationships thereof.

While the invention has been described in certain exemplary aspects of the many possible forms which lie within the broad scope of the invention—these forms being related primarily to aircraft landing systems, it should be clearly noted that the invention is not specifically so limited but may be employed for uniquely determining in an instrument-perceptible manner any single point or plurality of points in space at virtually any location or distance relative to a center point of a frame of reference of any type for any purpose whatsoever. For example, it might be used in missile or rocket guidance or for a variety of other purposes which will suggest themselves to persons skilled in the art.

It should be noted that while the comparison of the ground-originated field with the reference standard at the perceiving means has been described in various different specific versions hereinbefore as being used to specifically identify particular physical locations in space such as might lie along and effectively define an aircraft landing flight path, it is of course intended that the unbalanced relationship thereof, or a relationship thereof other than the specific predetermined position-indicating relationship, may be employed for indicating, by reason of the sense and the magnitude (or other condition) of the out-of-balance relationship, the error in the position of the perceiving means carried by the aircraft from the desired position on the proper aircraft landing flight path. This would indicate the magnitude of the positional error and also the sense of the positional error so that the human pilot or automatic pilot could make appropriate control corrections whereby to bring the aircraft back onto the correct landing flight path. In this connection, imbalance-indicating means may be employed which includes elements functionally equivalent to, and varying in accordance with, the effective imbalance of said conditions measured by the comparison means so that direct readings of positional displacement and the direction thereof can be made.

It should be noted that in the accompanying figures illustrating this application, a Cartesian coordinate type of frame of reference is employed. This is done because the earth has such a large radius, and the extent of the surface area of the earth of significance in the aircraft landing flight path illustrated in the figures is so small by comparison with the earth's large radius of curvature that the error occasioned by using a Cartesian coordinate type of frame of reference is minimal. In any case, it should be noted that the type of frame of reference employed is not a limiting factor of the present invention. Actually, a curvilinear coordinate type of frame of reference or, indeed, any suitable type of frame of reference may be employed without in any way affecting the basic efficacy of the novel apparatus and method of the present invention.

It should also be noted that, for purposes of simplification insofar as the drawings and the descriptive portion of this application are concerned, the various fields produced by the various field-producing means are shown as comprising substantially semi-spherical surfaces of equal potential relative to their individual origins. It should be clearly understood that this is in no way a limiting factor insofar as the broad scope of the present invention is concerned. Actually, any configuration of field surfaces of equal potential (or equal or uniquely related characteristics) may be employed provided that they effectively intercept and provide specific and particular physical locations of equal field potential for the intercepting fields—or of equal or uniquely related field characteristics at said intercept locations.

I am aware of the fact that a conventional dipole antenna which is relatively short with respect to the wavelength of the field produced thereby or radiated therefrom causes an equal potential surface to be symmetrically distributed in a substantially toroidal-shaped configuration therearound and that, as the antenna length relative to the wavelength increases, this configuration changes in correspondence therewith. However, it should be noted that various specific antenna designs or multiple antenna arrays and/or special positions and/or orientations thereof may be so arranged as to produce a great number of configurations of equal potential surfaces of the fields produced and/or radiated therefrom.

Furthermore, field-producing means such as high-strength electromagnets, coils, or the like, may be so shaped and/or positioned as to produce various shapes of equal potential field surfaces. Thus it can readliy be seen that equal potential field surfaces (or equal or uniquely related characteristics of field surfaces) of a substantially semi-spherical configuration similar to those employed in the illustrations of this application may be produced. However, it should be clearly understood that the invention is not limited to this specific shape but is intended to cover a great variety of different field configurations which may effectively intercept and provide well defined and instrument-perceptible equal potential or equal characteristics physical spacial locations, or such potential intercept or characteristic intercept locations where the compared potentials or characteristics bear predetermined or particular relationships to each other which correspond to a particular physical location.

It should be clearly understood that while the foregoing description has referred to the magnitudes of each pair of fields as the instrument-perceptible characteristic thereof, this has been done for exemplary purposes only and is not to be construed as in any manner specifically limiting the invention thereto. Actually, any instrument-perceptible characteristic may be substituted for magnitude, and the invention is intended to be broadly construed in this manner.

Also, it should be noted that the field, or fields, effectively defining an instrument-perceptible physical spacial location may comprise a modulating field, or a plurality of modulating fields, carried by a corresponding carrier, or corresponding plurality of carriers, and operating in accordance with, and being effectively comprised within, the broad principles, teachings, and scope of the present invention—and the invention includes and comprehends means and methods for accomplishing this. Since the production of such modulated fields carried by carrier fields is identical in basic principle to the direct production of primary fields not carrying additional modulating fields superimposed thereon, no additional illustrations and description thereof are throught necessary because they would be redundant and would add nothing to the completeness of the disclosure and teachings of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Apparatus for defining a spacial locus corresponding to an equation of the type Y equals a predetermined function of X relative to a reference center point of a coordinate frame of reference, said locus being defined by a plurality of different physical spacial locations along said locus, with the apparatus for defining an individual representative one of said physical locations along said locus comprising: means for producing in space a position-determining field which varies inversely in magnitude as a particular power of special displacement: means physically spaced a predetermined distance from said position-determining field producing means for producing a comparison reference standard field, the magnitude of said comparison reference standard field varying inversely in magnitude as one power less of spacial displacement than said position-determining field; instrument means remote from said reference center point and from both said field producing means for perceiving said position-determining field and said comparison reference standard field; and means connected to said perceiving instrument means for comparing the magnitudes of the two said fields when said perceiving instrument means is positioned spaced in a predetermined correlated manner from each of the two said field producing means to indicate whether said perceiving instrument means is positioned at said one of said physical locations along said locus.

2. Apparatus of the character defined in claim 1 wherein said position-determining field comprises an electromagnetic induction field which varies inversely in magnitude as a particular power of spacial displacement, and wherein said comparison reference standard field comprises an electromagnetic radiation field inversely varying in magnitude as one power less of spacial displacement than said induction field.

3. Apparatus of the character defined in claim 1 including a plurality of said position-determining field-producing means and a corresponding plurality of said comparison reference standard field-producing means corresponding to the plurality of particular physical locations which effectively define said spacial locus, said position-determining field-producing means and said comparison reference standard field-producing means having a plurality of spaced source locations whereby to define a corresponding plurality of intercept locations coincident with said plurality of particular physical locations defining said spacial locus, the position-determining field-producing means and the comparison reference standard field-producing means of each effectively cooperating and position-determining pair being spaced from each other whereby to cause the corresponding intercept locations to be sharply defined.

4. Apparatus of the character defined in claim 3 including means for time-division multiplexing the plurality of field-producing means in correlated timed sequential relationship whereby the two fields defining a given intercept location along said locus are time-division distinguished from other pairs of fields similarly uniquely defining other intercept locations along said locus for the prevention of fringe interference of said fields.

5. Apparatus of the character defined in claim 4 wherein said perceiving instrument means and said comparison means include means for correlating and comparing in the proper timed relationship the intercept fields uniquely determining any one of said particular physical locations along said locus.

6. Apparatus of the character defined in claim 4 wherein said perceiving instrument means and said comparison means include means for correlating and comparing in the proper timed relationship the intercept fields uniquely determining any one of said particular physical locations along said locus by correlatedly and distinctively comparing intercepting field portions uniquely determining the elevational location and the azimuth location of said particular physical location on said locus.

7. Apparatus of the character defined in claim 1 wherein said position-determining field-producing means and said comparison reference standard field-producing means effectively comprise elevation-determining means.

8. Apparatus of the character defined in claim 7 additionally including azimuth-determining means comprising means at predetermined fixed locations relative to said center reference point and adapted to produce in space azimuth-determining fields, and including means remote therefrom and adjacent to said first-mentioned perceiving instrument means for perceiving said azimuth-determining fields whereby to indicate when said perceiving means lies precisely on a particular azimuth plane relative to said center reference point.

References Cited

UNITED STATES PATENTS

| | | | |
|---|---|---|---|
| 1,939,686 | 12/1933 | Gage | 343—112 X |
| 1,961,757 | 6/1934 | Gage | 343—112 X |
| 2,344,070 | 3/1944 | Williams | 343—108 |
| 3,098,225 | 7/1963 | Anderson | 343—112 X |
| 3,160,369 | 12/1964 | Edmison. | |
| 3,182,328 | 5/1965 | Hings | 343—108 X |

RODNEY D. BENNETT, *Primary Examiner.*

CHESTER L. JUSTUS, *Examiner.*

H. C. WAMSLEY, *Assistant Examiner.*